(12) United States Patent
Tanabe

(10) Patent No.: US 9,948,114 B2
(45) Date of Patent: Apr. 17, 2018

(54) POWER SUPPLY APPARATUS

(71) Applicant: CANON KABUSHIKI KAISHA, Tokyo (JP)

(72) Inventor: Akihiro Tanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 267 days.

(21) Appl. No.: 14/858,788

(22) Filed: Sep. 18, 2015

(65) Prior Publication Data

US 2016/0087455 A1 Mar. 24, 2016

(30) Foreign Application Priority Data

Sep. 22, 2014 (JP) .................................. 2014-192878

(51) Int. Cl.
| | |
|---|---|
| H02J 5/00 | (2016.01) |
| H02J 7/02 | (2016.01) |
| H02J 17/00 | (2006.01) |
| H04B 5/00 | (2006.01) |
| H02J 50/12 | (2016.01) |
| H02J 50/80 | (2016.01) |

(52) U.S. Cl.
CPC ............. *H02J 5/005* (2013.01); *H02J 7/025* (2013.01); *H02J 17/00* (2013.01); *H02J 50/12* (2016.02); *H02J 50/80* (2016.02); *H04B 5/0031* (2013.01); *H04B 5/0037* (2013.01)

(58) Field of Classification Search
CPC .... G06F 8/65; G06F 1/26; H02J 5/005; H02J 7/025
See application file for complete search history.

(56) References Cited

U.S. PATENT DOCUMENTS

| | | |
|---|---|---|
| 8,527,786 B2 | 9/2013 | Nakano |
| 8,836,279 B2 | 9/2014 | Nakano |
| 2003/0015993 A1 | 1/2003 | Misra |
| 2011/0244794 A1 | 10/2011 | Nakano |
| 2011/0264297 A1 | 10/2011 | Nakano |
| 2012/0001591 A1 | 1/2012 | Fukaya |
| 2012/0040613 A1 | 2/2012 | Nakano |
| 2012/0256495 A1 | 10/2012 | Fukaya |
| 2013/0342160 A1 | 12/2013 | Tanabe |
| 2014/0208131 A1* | 7/2014 | Kano .................... H01M 10/46 713/300 |
| 2014/0292094 A1 | 10/2014 | Tsukamoto |
| 2014/0292095 A1 | 10/2014 | Tsukamoto |
| 2014/0365807 A1 | 12/2014 | Nakano |

(Continued)

FOREIGN PATENT DOCUMENTS

| | | |
|---|---|---|
| CN | 102055219 A | 5/2001 |
| CN | 102201696 A | 9/2011 |

(Continued)

*Primary Examiner* — Jeffrey Shin
(74) *Attorney, Agent, or Firm* — Canon U.S.A., Inc. IP Division

(57) ABSTRACT

A power supply apparatus includes a power supply unit that wirelessly supplies power to an electronic apparatus, a communication unit that communicates with the electronic apparatus, and a control unit that controls, based on whether information regarding the electronic apparatus that is received from the electronic apparatus is updated by the electronic apparatus, power to be supplied from the power supply apparatus to the electronic apparatus.

19 Claims, 9 Drawing Sheets

(56) References Cited

U.S. PATENT DOCUMENTS

| | | | | |
|---|---|---|---|---|
| 2015/0061398 A1* | 3/2015 | Kudo | ............... | H04B 5/0031 |
| | | | | 307/104 |
| 2015/0372493 A1* | 12/2015 | Sankar | ............... | H02J 5/005 |
| | | | | 307/104 |
| 2016/0164302 A1 | 6/2016 | Nakano | | |
| 2017/0018977 A1 | 1/2017 | Van Wageningen | | |

FOREIGN PATENT DOCUMENTS

| | | |
|---|---|---|
| CN | 103138358 A | 6/2013 |
| CN | 103368275 A | 10/2013 |
| JP | 2001-275266 A | 10/2001 |
| JP | 2008-113519 A | 5/2008 |
| JP | 2012222946 A | 11/2012 |
| JP | 2014007862 A | 1/2014 |
| WO | 2014/103191 A1 | 7/2014 |

\* cited by examiner

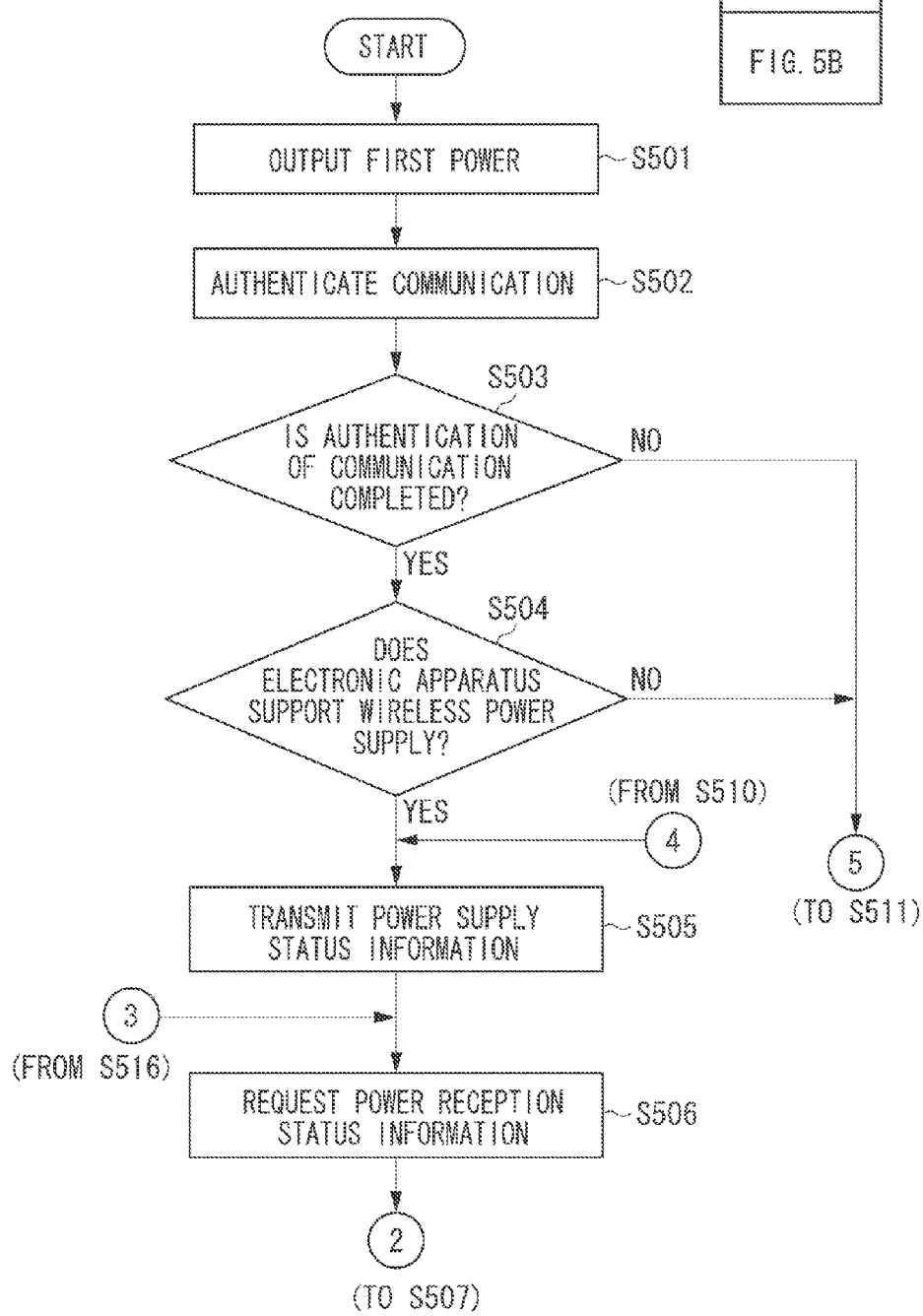

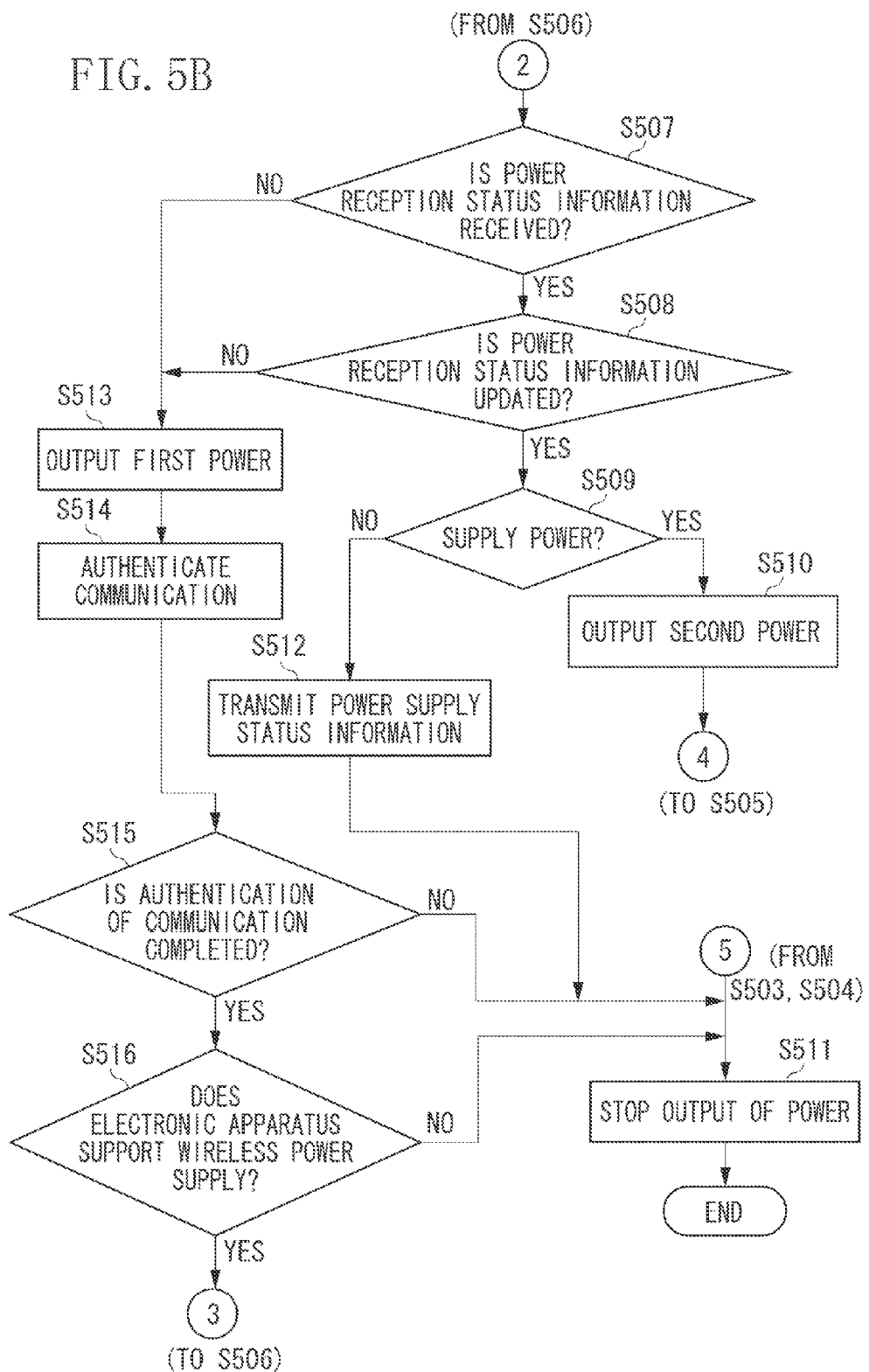

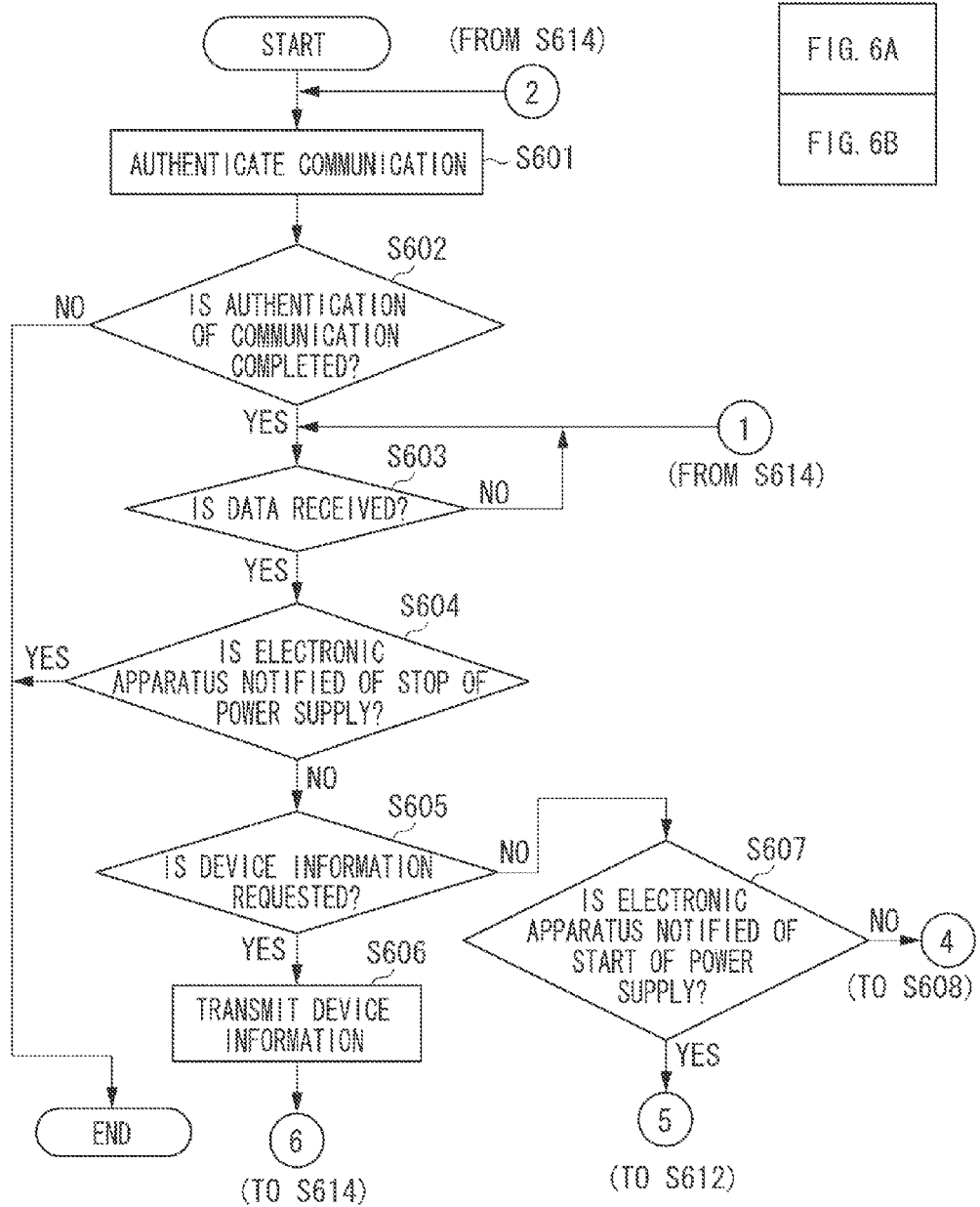

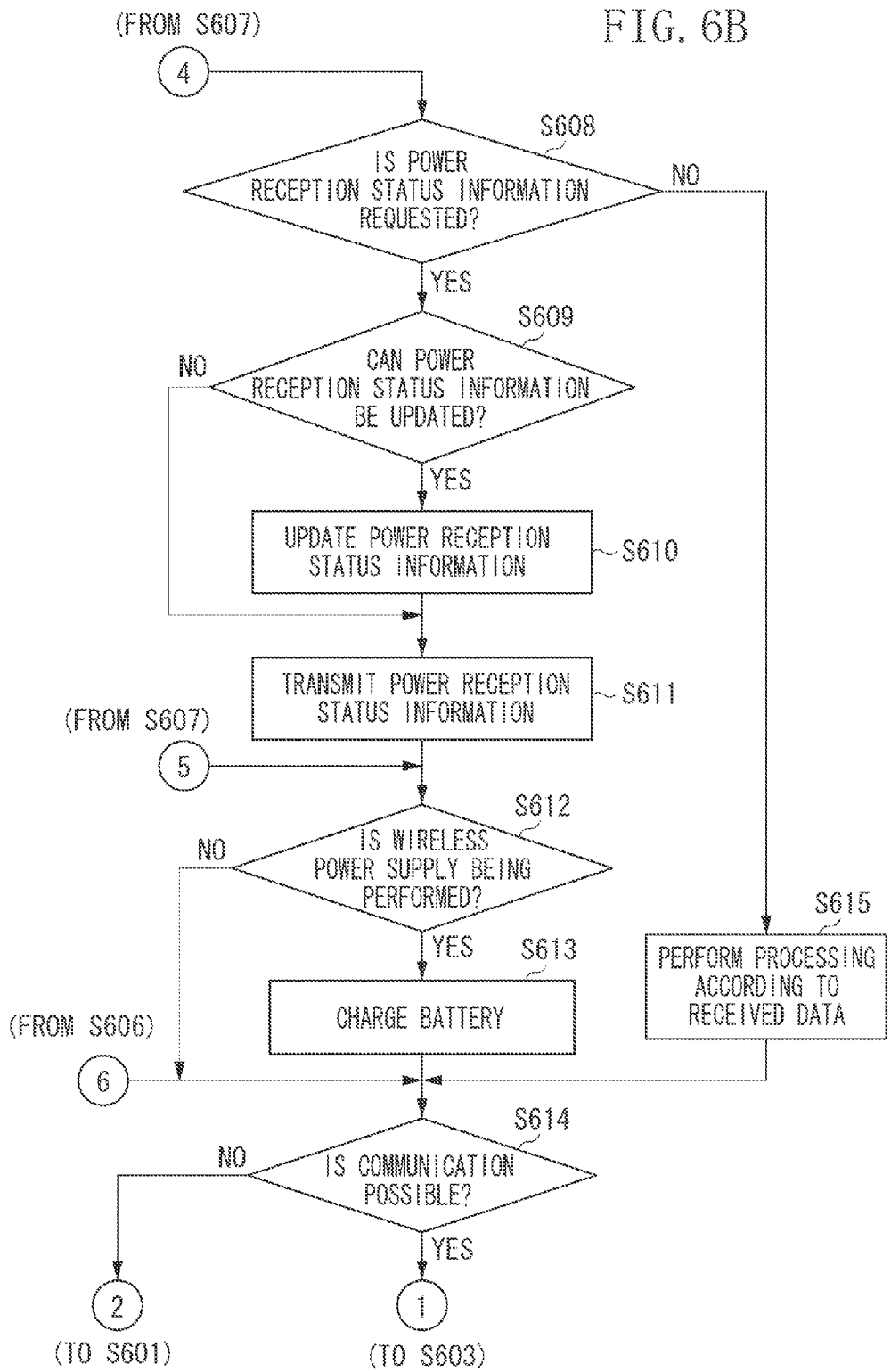

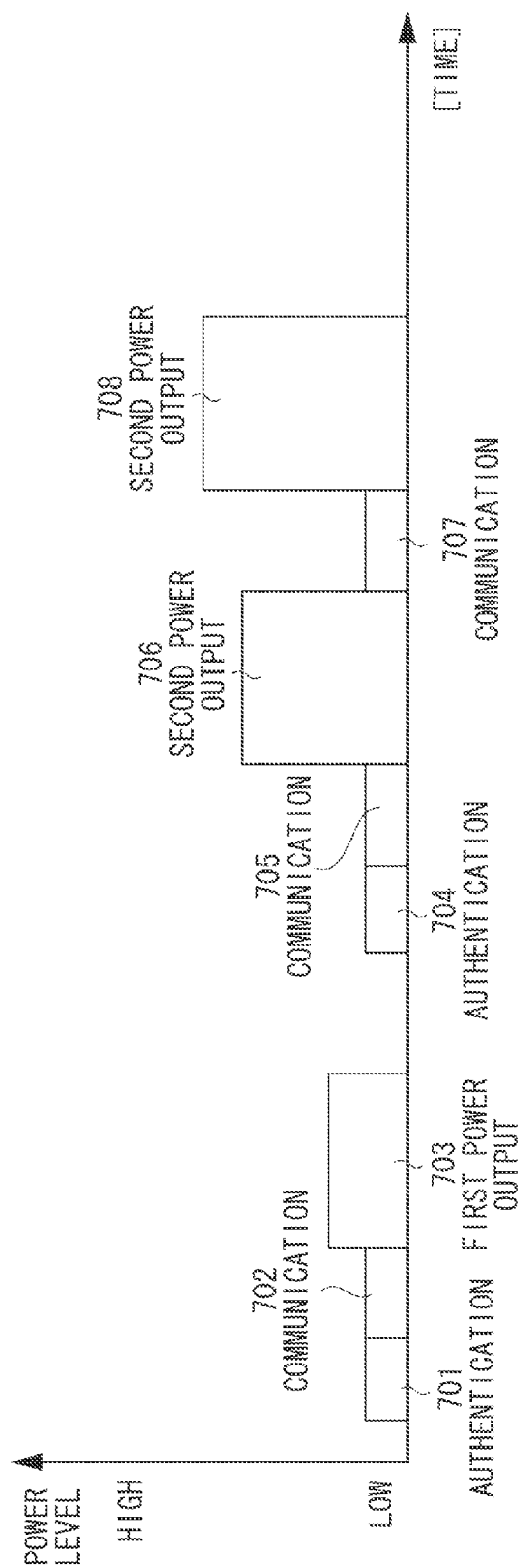

POWER SUPPLY APPARATUS

BACKGROUND

Field of the Invention

The present invention relates to a power supply apparatus that wirelessly supplies power.

Description of the Related Art

In recent years, there has been known a power supply system that wirelessly transmits power without a connection using a connector. There has been known, in this type of power supply system, a power supply apparatus that performs data communication for transmitting a command to an electronic apparatus and transmitting power to the electronic apparatus via a same antenna (see Japanese Patent Application Laid-Open No. 2008-113519).

In this type of power supply system, there is a demand for allowing the power supply apparatus to control, with use of a state of the electronic apparatus, power to be supplied from the power supply apparatus to the electronic apparatus. In this case, the electronic apparatus needs to periodically detect its own state, and notify the power supply apparatus of a result of this detection.

However, without supplying power required to detect a state of the electronic apparatus to the electronic apparatus, the electronic apparatus cannot detect its own state, and therefore cannot correctly notify the power supply apparatus of its own state. Therefore, in some cases, the power supply apparatus supplies excessive power to the electronic apparatus even though the power supply apparatus has controlled, with use of the state of the electronic apparatus notified from the electronic apparatus, power to be supplied from the power supply apparatus to the electronic apparatus.

SUMMARY

According to an aspect of the present invention, there is provided a power supply apparatus capable of appropriately controlling power to be supplied from the power supply apparatus to an electronic apparatus.

According to an aspect of the present invention, there is provided a power supply apparatus capable of appropriately detecting a state of an electronic apparatus in a case where power is supplied from the power supply apparatus to the electronic apparatus.

According to an aspect of the present invention, there is provided a power supply apparatus including a power supply unit that wirelessly supplies power to an electronic apparatus, a communication unit that communicates with the electronic apparatus, and a control unit that controls, based on whether information regarding the electronic apparatus that is received from the electronic apparatus is updated by the electronic apparatus, power to be supplied from the power supply apparatus to the electronic apparatus.

Further features and aspects of the present invention will become apparent from the following description of exemplary embodiments.

BRIEF DESCRIPTION OF THE DRAWINGS

The drawings, which are incorporated in and constitute a part of the specification, illustrate exemplary embodiments, features, and aspects of the present invention.

FIG. 5 (consisting of FIGS. 5A and 5B) is a flowchart illustrating an example of a power supply process according to the first exemplary embodiment.

FIG. 6 (consisting of FIGS. 6A and 6B) is a flowchart illustrating an example of a power reception process according to the first exemplary embodiment.

FIG. 7 illustrates an example of an operation of the power supply apparatus according to the first exemplary embodiment.

DESCRIPTION OF THE EMBODIMENTS

Exemplary embodiments, features, and aspects of the present invention will be described below with reference to the drawings.

Figure 1:
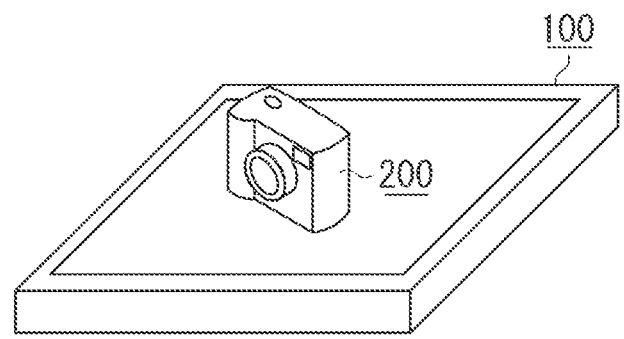
FIG. 1 illustrates an example of a power supply system according to a first exemplary embodiment.

In the following description, a first exemplary embodiment will be described in detail with reference to the drawings. As illustrated in FIG. 1, a power supply system according to the first exemplary embodiment includes a power supply apparatus 100 and an electronic apparatus 200. In the power supply system according to the first exemplary embodiment, the power supply apparatus 100 wirelessly supplies power to the electronic apparatus 200 if the electronic apparatus 200 is located within a predetermined range. Furthermore, the electronic apparatus 200 wirelessly receives power output from the power supply apparatus 100 if located within the predetermined range. On the other hand, the electronic apparatus 200 cannot receive power from the power supply apparatus 100 if not located within the predetermined range. The predetermined range is defined to be a range that allows the power supply apparatus 100 and the electronic apparatus 200 to communicate with each other. Furthermore, the power supply apparatus 100 may wirelessly supply power to electronic apparatuses.

The electronic apparatus 200 may be an image capture apparatus, such as a camera, or may be a reproduction apparatus that reproduces audio data and image data. Alternatively, the electronic apparatus 200 may be a communication apparatus, such as a mobile phone and a smartphone. Alternatively, the electronic apparatus 200 may be a battery pack including a battery 209. Alternatively, the electronic apparatus 200 may be an apparatus such as a vehicle that is driven by power supplied from the power supply apparatus 100. Alternatively, the electronic apparatus 200 may be an apparatus that receives a television broadcast, a display that displays image data, or a personal computer. Furthermore, the electronic apparatus 200 may be an apparatus that operates with use of power supplied from the power supply apparatus 100 even without the battery 209 mounted thereon.

Figure 2:
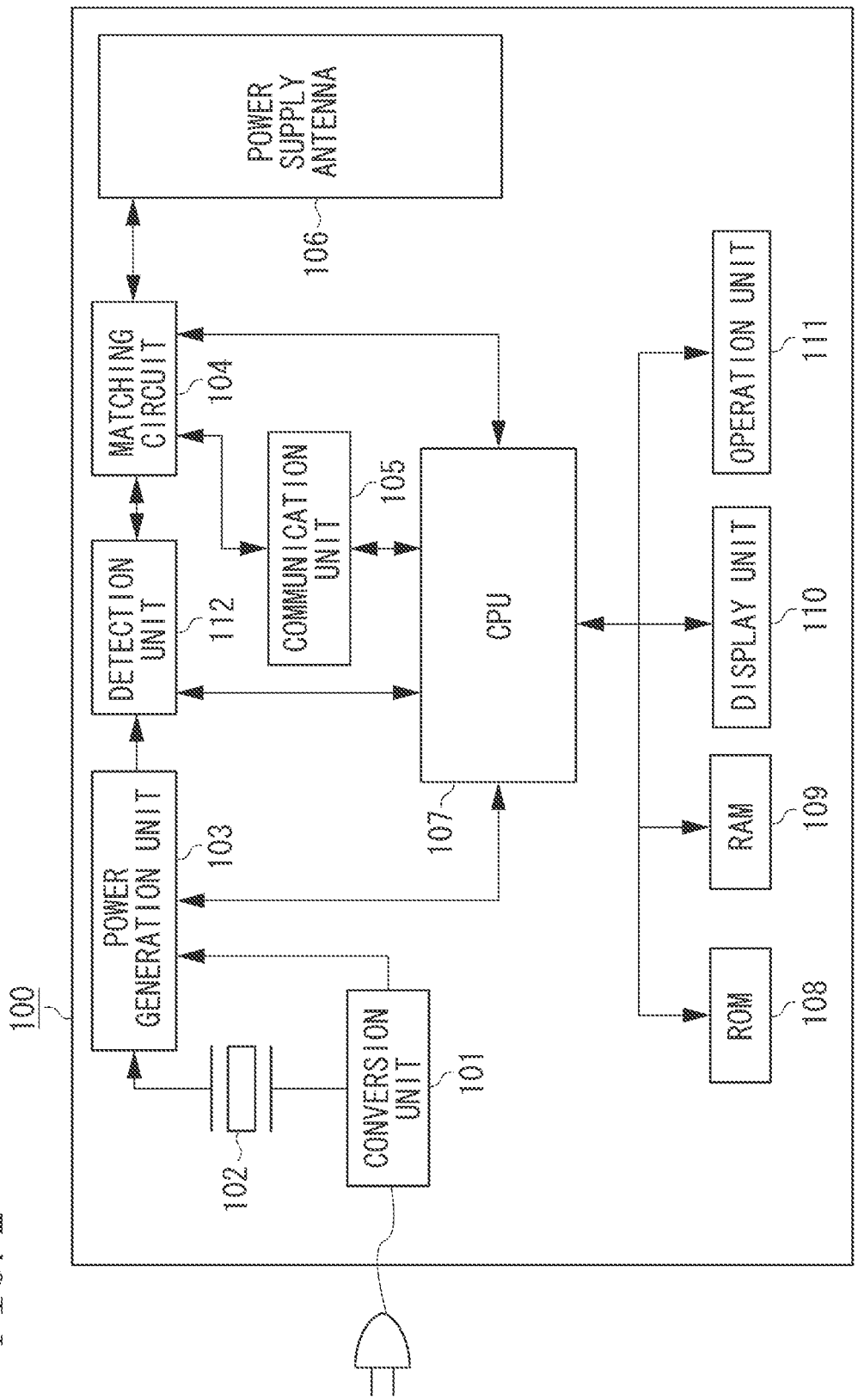
FIG. 2 is a block diagram illustrating an example of a power supply apparatus according to the first exemplary embodiment.

FIG. 2 is a block diagram illustrating an example of a configuration of the power supply apparatus 100. As illustrated in FIG. 2, the power supply apparatus 100 includes a conversion unit 101, an oscillator 102, a power generation unit 103, a matching circuit 104, a communication unit 105, a power supply antenna 106, a central processing unit (CPU) 107, a read only memory (ROM) 108, a random access memory (RAM) 109, a display unit 110, an operation unit 111, and a detection unit 112.

In a case where an alternating-current (AC) power source and the power supply apparatus 100 are connected to each other, the conversion unit 101 converts alternating-current power supplied from the AC power source into direct-current power, and supplies the converted direct-current power to the power supply apparatus 100.

The oscillator 102 produces a frequency signal that is used to control the power generation unit 103 so as to convert power supplied from the conversion unit 101 into target power set by the CPU 107. A crystal oscillator or the like is used as the oscillator 102.

The power generation unit 103 generates power to be output to the outside via the power supply antennal 106 based on power supplied from the conversion unit 101 and the frequency signal produced by the oscillator 102. The power generated by the power generation unit 103 is supplied to the matching circuit 104 via the detection unit 112.

The power generated by the power generation unit 103 includes first power and second power. The first power is power that is used for the communication unit 105 to communicate with the electronic apparatus 200 via the power supply antenna 106. The second power is power that is used for the electronic apparatus 200 to charge the battery 209 and perform a predetermined process. For example, the first power is power of 1 W or lower, and the second power is power of 2 W or higher. The first power is defined to be power lower than the second power. Furthermore, the first power may be power specified in a communication standard of the communication unit 105. Furthermore, the first power is not limited to the power of 1 W or lower. Furthermore, the second power is not limited to the power of 2 W or higher as long as the second power is power usable to allow the electronic apparatus 200 to charge the battery 109 and perform the predetermined process.

The matching circuit 104 is a resonance circuit for achieving resonance between the power supply antenna 106 and a power reception antenna 201 of the electronic apparatus 200. Furthermore, the matching circuit 104 includes a circuit for achieving impedance matching between the power generation unit 103 and the power supply antennal 106. The matching circuit 104 includes an inductor and a capacitor.

In a case where the power supply apparatus 100 outputs any one of the first power and the second power, the CPU 107 controls the matching circuit 104 so as to set a resonance frequency f of the power supply antenna 106 to a predetermined frequency to achieve the resonance between the power supply antenna 106 and the power reception antenna 201. At this time, the CPU 107 changes the resonance frequency f of the power supply antenna 106 by controlling a value of an inductance included in the matching circuit 104 and a value of the capacitor included in the matching circuit 104. Assume that the predetermined frequency is, for example, a frequency of 13.56 MHz.

The communication unit 105 performs, for example, close proximity wireless communication based on NFC (Near Filed Communication) standard defined by the NFC forum. In a case where the first power is output from the power supply antenna 106, the communication unit 105 can transmit and receive data for carrying out the wireless power supply with the electronic apparatus 200 via the power supply antenna 106. However, assume that the communication unit 105 does not communicate with the electronic apparatus 200 via the power supply antenna 106 while the second power is output from the power supply antenna 106. In a case where the first power is output from the power supply antenna 106, the communication unit 105 transmits the data to the electronic apparatus 200 by superposing data onto the first power. In a case where transmitting the data to the power supply apparatus 100, the electronic apparatus 200 modulates a load inside the electronic apparatus 200, which causes a change in a current flowing in the power supply antenna 106. Therefore, the communication unit 105 can receive the data from the electronic apparatus 200 by detecting the current flowing in the power supply antenna 106, and analyzing that.

The data transmitted between the communication unit 105 and the electronic apparatus 200 is data in compliance with NFC Data Exchange Format (NDEF).

The power supply antenna 106 is an antenna for outputting power generated by the power generation unit 103 to the outside. The power supply apparatus 100 supplies power to the electronic apparatus 200 via the power supply antenna 106, and transmits the data to the electronic apparatus 200 via the power supply antenna 106. Furthermore, the power supply apparatus 100 receives the data from the electronic apparatus 200 via the power supply antenna 106.

The CPU 107 controls the power supply apparatus 100 by executing a computer program stored in the ROM 108. The CPU 107 controls power to be supplied to the electronic apparatus 200 by controlling the power generation unit 103.

The ROM 108 stores information such as the computer program for controlling the power supply apparatus 100, and a parameter regarding the power supply apparatus 100.

The RAM 109 records the data acquired from the electronic apparatus 200 by the communication unit 105.

The display unit 110 displays image data provided from any one of the RAM 109 and the ROM 108. Furthermore, the display unit 110 displays a warning toward a user. The display unit 110 includes a light-emitting diode (LED) 113 including a light-emitting diode or the like. The CPU 107 lights the LED 113 according to an operation performed by the power supply apparatus 100.

The operation unit 111 provides a user interface for operating the power supply apparatus 100. The operation unit 111 includes a power button of the power supply apparatus 100, a mode switching button of the power supply apparatus 100, and the like. Each of the buttons is constituted by a switch, a touch panel, or the like. The CPU 107 controls the power supply apparatus 100 according to an input signal input via the operation unit 111.

The detection unit 112 detects a voltage standing wave ratio (VSWR) to detect a resonance state between the power supply apparatus 100 and the electronic apparatus 200. Furthermore, the detection unit 112 provides data indicating the detected VSWR to the CPU 107. The VSWR is a value indicating a relationship between a traveling wave of power output from the power supply antenna 106 and a reflection wave of power output from the power supply antenna 106. The CPU 107 can detect whether an object is placed in the vicinity of the power supply apparatus 100 with use of the data indicating the VSWR that is provided from the detection unit 112.

Figure 3:
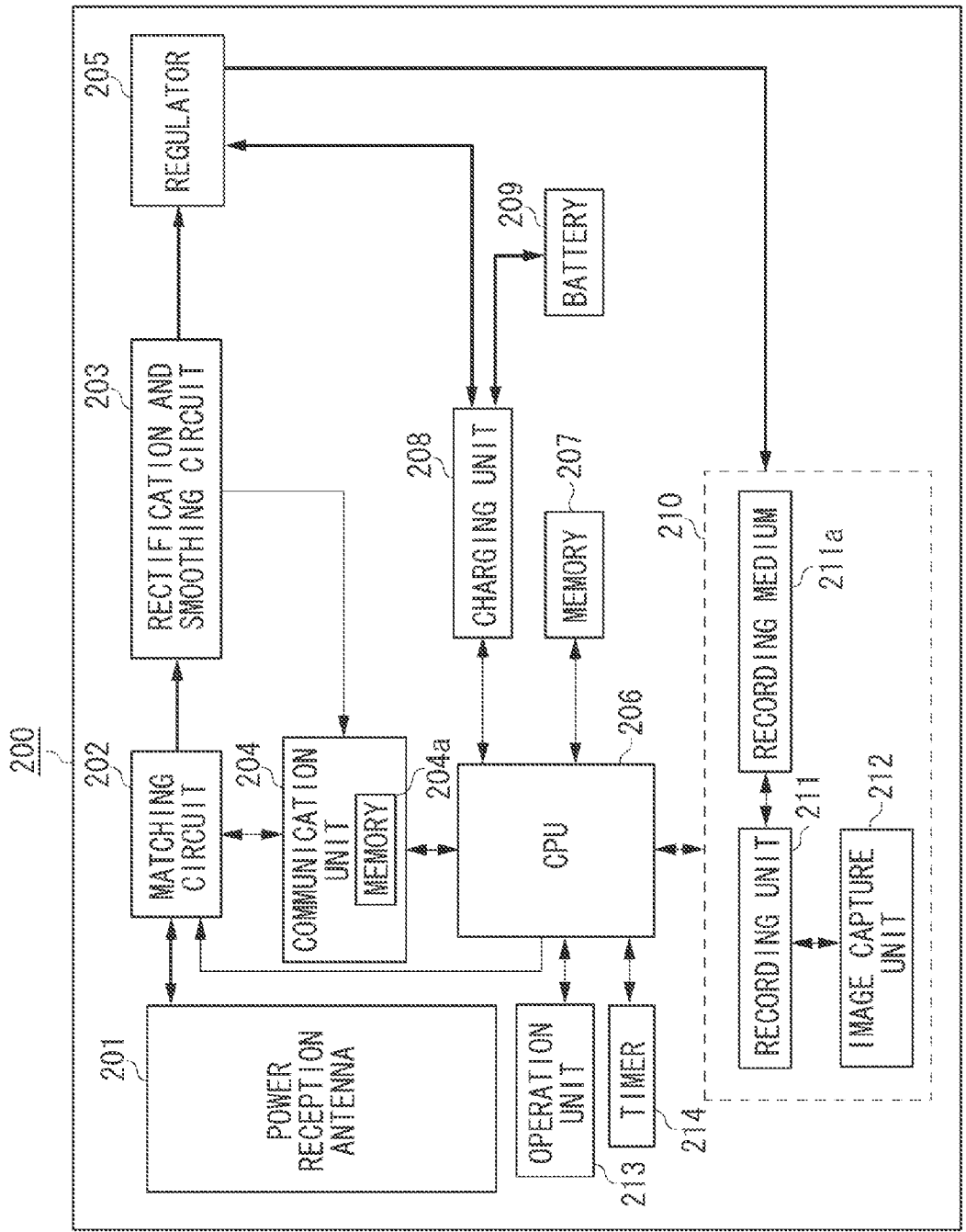
FIG. 3 is a block diagram illustrating an example of an electronic apparatus according to the first exemplary embodiment.

Next, an example of a configuration of the electronic apparatus 200 will be described with reference to FIG. 3. The electronic apparatus 200 includes the power reception antenna 201, a matching circuit 202, a rectification and smoothing circuit 203, a communication unit 204, a regulator 205, a CPU 206, and a memory 207. Furthermore, the electronic apparatus 200 includes a charging unit 208, the battery 209, a system 210, an operation unit 213, and a timer 214.

The power reception antenna 201 is an antenna for receiving power supplied from the power supply apparatus 100. The electronic apparatus 200 receives power from the power supply apparatus 100 via the power reception antenna 201. Furthermore, the electronic apparatus 200 wirelessly communicates with the power supply apparatus 100 via the power reception antenna 201.

The matching circuit 202 is a resonance circuit for achieving the resonance between the power supply antenna 106 and the power reception antenna 201 according to a frequency equal to the resonance frequency f of the power supply antenna 106. Furthermore, the matching circuit 202 includes a circuit for achieving impedance matching between the power reception antenna 201 and the rectification and smoothing circuit 203. The matching circuit 202 includes an inductor and a capacitor. The CPU 206 controls a value of the inductor and a value of the capacitor included in the matching circuit 202 so as to cause the power reception antenna 201 to oscillate with the frequency equal to the resonance frequency f of the power supply antenna 106. Furthermore, the matching circuit 202 supplies power received by the power reception antenna 201 to the rectification and smoothing circuit 203.

The rectification and smoothing circuit 203 removes the data and a noise from power supplied from the matching circuit 202, and generates direct-current power. Furthermore, the rectification and smoothing circuit 203 supplies the generated direct-current power to the regulator 205. The rectification and smoothing circuit 203 provides the data removed from power received by the power reception antenna 201 to the communication unit 204.

The communication unit 204 wirelessly communicates with an external apparatus, such as the power supply apparatus 100, according to the same communication standard as the communication unit 105. The communication unit 204 analyzes the data provided from the rectification and smoothing circuit 203, and provides a result of the analysis of the data to the CPU 206. In a case where the first power is supplied from the power supply apparatus 100 to the electronic apparatus 200, the CPU 206 transmits response data as a response to the received data to the power supply apparatus 100. At this time, the CPU 206 controls the communication unit 204 so as to change a load included in the communication unit 204 to transmit the response data as the response to the received data to the power supply apparatus 100. The communication unit 204 includes a memory 204a.

Figure 4:
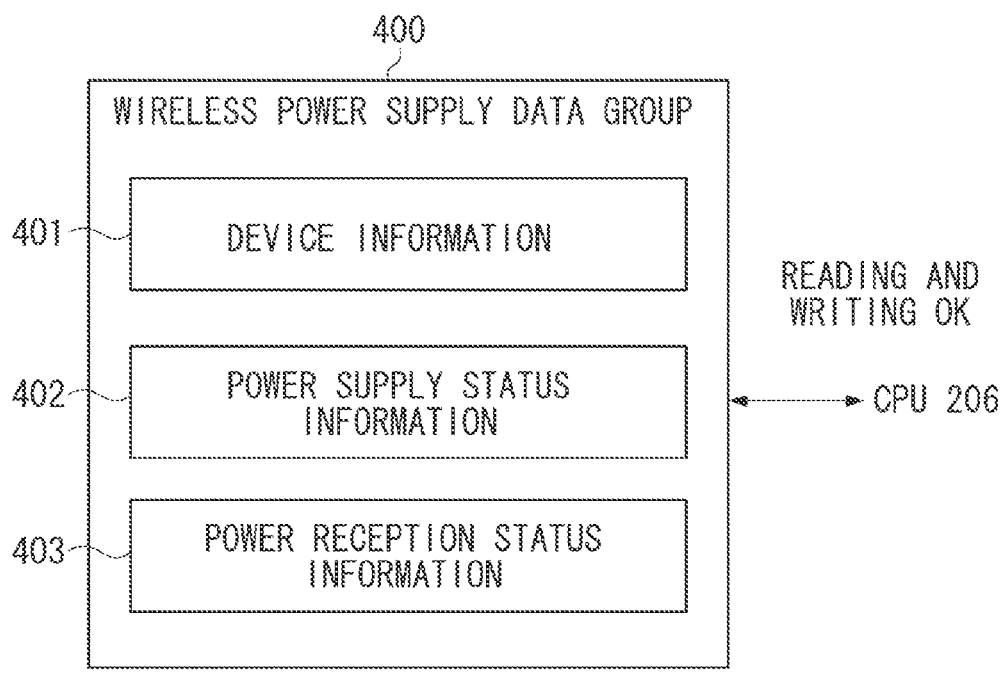
FIG. 4 illustrates an example of wireless power supply data group according to the first exemplary embodiment.

The memory 204a stores a wireless power supply data group 400. FIG. 4 illustrates the wireless power supply data group 400. The wireless power supply data group 400 stores the data transmitted between the power supply apparatus 100 and the electronic apparatus 200. The wireless power supply data group 400 stores device information 401, power supply status information 402, and power reception status information 403. The device information 401, the power supply status information 402, and the power reception status information 403 are data in compliance with NDEF.

The device information 401 includes information for identifying the electronic apparatus 200, information for identifying a power supply method that the electronic apparatus 200 supports, information indicating a power class of the electronic apparatus 200, and the like. Furthermore, the device information 401 includes information indicating the number of power supply methods that the electronic apparatus 200 supports. Therefore, in a case where the electronic apparatus 200 supports power supply methods, the device information 401 includes information indicating that the electronic apparatus 200 supports the plurality of power supply methods. Furthermore, the device information 401 includes information indicating a response time, which is a time taken since the power reception status information 403 is requested from the power supply apparatus 100 until the electronic apparatus 200 transmits the power reception status information 403 to the power supply apparatus 100. The information indicating the power class of the electronic apparatus 200 is information indicating a maximum value of the power that the electronic apparatus 200 can receive from the power supply apparatus 100. For example, in a case where the maximum value of the power that the electronic apparatus 200 can receive from the power supply apparatus 100 is 1 W, information indicating that the electronic apparatus 200 supports a low power class is set as the information indicating the power class of the electronic apparatus 200. For example, in a case where the maximum value of the power that the electronic apparatus 200 can receive from the power supply apparatus 100 is 3 W, information indicating that the electronic apparatus 200 supports a middle power class is set as the information indicating the power class of the electronic apparatus 200. For example, in a case where the maximum value of the power that the electronic apparatus 200 can receive from the power supply apparatus 100 is 6 W, information indicating that the electronic apparatus 200 supports a high power class is set as the information indicating the power class of the electronic apparatus 200.

The device information 401 is information transmitted to the power supply apparatus 100 by the communication unit 204. The device information 401 is fixed data stored in the memory 204a in advance.

The power supply status information 402 includes information indicating whether the power supply apparatus 100 starts or stops supplying power from the power supply apparatus 100 to the electronic apparatus 200, information indicating whether an error occurs in the power supply apparatus 100, and update data, which will be described below. The power supply status information 402 may further include information indicating a time period during which the second power is output. Furthermore, the power supply status information 402 includes information for identifying a power supply method that the power supply apparatus 100 supports, and information indicating the number of power supply methods that the power supply apparatus 100 supports. Furthermore, the power supply status information 402 includes information indicating a power class of the power supply apparatus 100. The information indicating the power class of the power supply apparatus 100 is information indicating a maximum value of the power that the power supply apparatus 100 can output. For example, in a case where the maximum value of the power that the power supply apparatus 100 can output is 3 W, information indicating that the power supply apparatus 100 supports a low power class is set as the information indicating the power class of the power supply apparatus 100. For example, in a case where the maximum value of the power that the power supply apparatus 100 can output is 10 W, information indicating that the power supply apparatus 100 supports a middle power class is set as the information indicating the power class of the power supply apparatus 100. For example, in a case where the maximum value of the power that the power supply apparatus 100 can output is 20 W, information indicating that the power supply apparatus 100 supports a high power class is set as the information indicating the power class of the power supply apparatus 100.

The power supply status information 402 is information stored into the wireless power supply data group 400 in the memory 204a from the communication unit 105. After the power supply status information 402 is stored into the memory 204a, the CPU 206 can control the electronic apparatus 200 according to the power supply status information 402 by reading out the power supply status information 402.

The power reception status information 403 includes information indicating whether an error occurs in the electronic apparatus 200, information indicating whether the electronic apparatus 200 requests the power supply apparatus 100 to supply power, and update data, which will be described below. The power reception status information 403 may further include any one of information for requesting the power supply apparatus 100 to increase power supplied to the electronic apparatus 200, and information for requesting the power supply apparatus 100 to reduce power supplied to the electronic apparatus 200. The power reception status information 403 may further include information for requesting the power supply apparatus 100 to keep power supplied to the electronic apparatus 200 at a present level. Furthermore, the power reception status information 403 may further include information regarding a remaining capacity of the battery 209 and/or information regarding the charging of the battery 209. The power reception status information 403 is information stored into the wireless power supply data group 400 in the memory 204a by the CPU 206. The power reception status information 403 is periodically updated by the CPU 206.

The communication unit 204 consumes power lower than the CPU 206. The communication unit 204 can communicate with the communication unit 105 with use of power received from the power supply apparatus 100 by the power reception antenna 201 while the first power is output from the power supply apparatus 100.

The regulator 205 performs control so as to supply power supplied from any one of the rectification and smoothing circuit 203 and the battery 209 to the electronic apparatus 200. The regulator 205 supplies power supplied from the power supply apparatus 100 via the rectification and smoothing circuit 203 to the electronic apparatus 200 according to an instruction from the CPU 206. The regulator 205 supplies discharged power supplied from the battery 209 via the charging unit 208 to the electronic apparatus 200 according to an instruction from the CPU 206.

The CPU 206 controls the electronic apparatus 200 according to the result of the analysis of the data provided from the communication unit 204. Furthermore, the CPU 206 controls the electronic apparatus 200 by executing a computer program stored in the memory 207.

The CPU 206 generates the power reception status information 403 according to information provided from each of the units of the electronic apparatus 200, deletes the power reception status information 403 stored in the memory 204a, and then stores the newly generated power reception status information 403 into the wireless power supply data group 400. With this operation, the CPU 206 periodically updates the power reception status information 403.

The memory 207 stores the computer program for controlling the electronic apparatus 200. Furthermore, the memory 207 records information regarding the electronic apparatus 200, and the like.

The charging unit 208 charges the battery 209 with use of power supplied from the regulator 205. Furthermore, in a case where power is not supplied from the regulator 205, the charging unit 208 supplies the discharged power supplied from the battery 209 to the regulator 205. The charging unit 208 periodically detects the information regarding the battery 209 and the information regarding the charging of the battery 209, and notifies the CPU 206 of the detected information.

The battery 209 is a battery attachable to and detachable from the electronic apparatus 200. Furthermore, the battery 209 is a chargeable secondary battery.

The system 210 includes a recording unit 211 and an image capture unit 212.

The recording unit 211 records data such as image data and audio data provided from the image capture unit 212 into a recording medium 211a. Furthermore, the recording unit 211 reads out the data such as the image data and the audio data from the recording medium 211a. The recording medium 211a may be a hard disk, a memory card, or the like, and may be built in the electronic apparatus 200 or may be an external recording medium detachably attached to the electronic apparatus 200.

The image capture unit 212 includes an image sensor for generating image data from an optical image of an object, an image processing circuit that performs image processing on the image data generated by the image sensor, a compression and decompression circuit for compressing the image data and decompressing the compressed image data, and the like. The image capture unit 212 captures an image of an object, and provides the image data, such as a still image or a moving image, acquired from a result of the image capturing to the recording unit 211. The recording unit 211 records the image data provided from the image capture unit 212 into the recording medium 211a. The image capture unit 212 may further include a configuration required to capture an image of an object.

The system 210 includes a unit to which power is supplied from the regulator 205 while the electronic apparatus 200 is powered on. Therefore, the system 210 may further include a display unit for displaying the image data, a unit for transmitting and receiving an electronic mail, in addition to the recording unit 211, the recording medium 211a, and the image capture unit 212.

The operation unit 213 is a user interface for operating the electronic apparatus 200. The operation unit 213 includes a power button for operating the electronic apparatus 200, a mode switching button for switching a mode of the electronic apparatus 200. Each of the buttons is constituted by a switch, a touch panel, or the like. In a case where being operated by the user, the operation unit 213 provides a signal corresponding to the operation performed by the user to the CPU 206. The operation unit 213 may control the electronic apparatus 200 according to a remote signal received from a remote controller.

The timer 214 measures a time regarding a process performed by each of the units of the electronic apparatus 200.

Furthermore, each of the power supply antenna 106 and the power reception antenna 201 may be a helical antenna or a loop antenna, or may be a planar antenna, such as a meander line antenna.

In the first exemplary embodiment, the power supply apparatus 100 is configured to wirelessly supply power to the electronic apparatus 200 based on the magnetic resonance method, but the method for wirelessly supplying power is not limited thereto.

For example, the power supply apparatus 100 may be configured to wirelessly supply power to the electronic apparatus 200 based on electric field coupling, instead of the magnetic resonance method. In this case, an electrode is required to be mounted on each of the power supply apparatus 100 and the electronic apparatus 200, and power is wirelessly supplied from the electrode of the power supply apparatus 100 to the electrode of the electronic apparatus 200.

Alternatively, for example, the power supply apparatus 100 may be configured to wirelessly supply power to the electronic apparatus 200 based on electromagnetic induction, instead of the magnetic resonance method.

The power supply apparatus 100 is configured to wirelessly supply power to the electronic apparatus 200. However, the term "wirelessly" may be replaced with a phrase "in a non-contact manner" or a phrase "in a contactless manner".

(Power Supply Process)

Next, a power supply process performed by the CPU 107 according to the first exemplary embodiment will be described with reference to a flowchart illustrated in FIG. 5 (consisting of FIGS. 5A and 5B). The CPU 107 executes the computer program stored in the ROM 108, by which the power supply process can be realized.

In a case where the power supply apparatus 100 is powered on, in step S501, the CPU 107 controls at least one of the oscillator 102, the power generation unit 103, and the matching circuit 104 so as to output the first power via the power supply antenna 106. Then, the power supply process proceeds to step S502.

In step S502, the CPU 107 causes the communication unit 105 to carry out authentication for wirelessly communicating with the communication unit 204. Then, the power supply process proceeds to step S503.

In step S503, the CPU 107 determines whether the authentication for wirelessly communicating with the communication unit 204 is completed. If the authentication for wirelessly communicating with the communication unit 204 is completed (YES in step S503), the power supply process proceeds to step S504. If the authentication for wirelessly communicating with the communication unit 204 is not completed (NO in step S503), the power supply process proceeds to step S511.

In step S504, the CPU 107 determines whether the electronic apparatus 200 supports the wireless power supply. For example, the CPU 107 controls the communication unit 105 so as to transmit data for acquiring the device information 401 to the electronic apparatus 200. In a case where the device information 401 is received by the communication unit 105, the CPU 107 determines whether the electronic apparatus 200 supports the wireless power supply with use of the device information 401 received by the communication unit 105. If the electronic apparatus 200 supports the wireless power supply (YES in step S504), the power supply process proceeds to step S505. If the electronic apparatus 200 does not support the wireless power supply (NO in step S504), the power supply process proceeds to step S511.

In step S505, the CPU 107 generates the power supply status information 402, and controls the communication unit 105 so as to transmit the generated power supply status information 402 to the electronic apparatus 200. The power supply status information 402 generated by the CPU 107 in step S505 includes information indicating that the power supply apparatus 100 will start supplying power from the power supply apparatus 100 to the electronic apparatus 200, information indicating that no error occurs in the power supply apparatus 100, and the update data. The update data is used to determine whether the power reception status information 403 is updated by the CPU 206. The update data may be a randomly generated value, or may be a predetermined value. The CPU 107 generates the power supply status information 402 by reading out the update data stored in the RAM 109. The description will be given below, assuming that a value of the update data transmitted to the electronic apparatus 200 in step S505 is set to "N". Assume that "N" is a natural number.

Upon the transmission of the power supply status information 402 by the communication unit 105, the power supply process proceeds to step S506. The power supply status information 402 transmitted by the communication unit 105 is stored into the wireless power supply data group 400 in the memory 204a.

Upon receiving the power supply status information 402, the communication unit 204 stores the power supply status information 402 received from the power supply apparatus 100 into the wireless power supply data group 400 in the memory 204a. At this time, the communication unit 204 notifies the CPU 206 that the power supply status information 402 is received.

In step S506, the CPU 107 controls the communication unit 105 so as to transmit data for requesting the power reception status information 403 to the electronic apparatus 200. Then, the power supply process proceeds to step S507.

Upon receiving the data for requesting the power reception status information 403, the communication unit 204 notifies the CPU 206 that the power reception status information 403 is requested. Therefore, if sufficient power is supplied from any one of the battery 209 and the rectification and smoothing circuit 203, and if no error occurs in the CPU 206, the CPU 206 performs a process for updating the power reception status information 403 stored in the memory 204a. Upon completing the update of the power reception status information 403 stored in the memory 204a, the CPU 206 reads out the power supply status information 402 from the wireless power supply data group 400 in the memory 204a, and acquires the update data included in the power supply status information 402. After that, the CPU 206 adds a specific value to the value of the update data acquired from the power supply status information 402, and stores the value of the update data with the specific value added thereto into the power reception status information 403. For example, if the value of the update data included in the power supply status information 402 is set to "N", the CPU 206 adds "1", which is the specific value, to the value "N" of the update data after completing the update of the power reception status information 403. After that, the CPU 206 stores the value "N+1" of the update data acquired as a result of the calculation into the power reception status information 403. The CPU 206 does not add the specific value to the update data acquired from the power supply status information 402 until completing the update of the power reception status information 403. Therefore, the same update data as the update data included in the power supply status information 402 is stored in the power reception status information 403 stored in the memory 204a until the completion of the update of the power reception status information 403.

However, if the sufficient power is not supplied from the battery 209 and the rectification and smoothing circuit 203, the CPU 206 cannot update the power reception status information 403 stored in the memory 204a. In this case, since the power reception status information 403 stored in the memory 204a is not updated, the same update data as the update data included in the power supply status information 402 is stored in the power reception status information 403 stored in the memory 204a.

Furthermore, even when the sufficient power is supplied from any one of the battery 209 and the rectification and smoothing circuit 203, the CPU 206 cannot update the power reception status information 403 stored in the memory 204a if an error occurs in the CPU 206. In this case, since the power reception status information 403 stored in the memory 204a is not updated, the same value of the update data as the value of the update data included in the power supply status information 402 is stored in the power reception status information 403 stored in the memory 204a.

Upon receiving the data for requesting the power reception status information 403 from the power supply apparatus 100, the communication unit 204 transmits the power reception status information 403 stored in the wireless power supply data group 400 in the memory 204a to the power supply apparatus 100 as the response data within the response time. Therefore, if the power reception status information 403 is updated by the CPU 206, the communication unit 204 transmits the updated power reception status information 403 to the power supply apparatus 100 as the response data. On the other hand, if the power reception status information 403 is not updated by the CPU 206, the communication unit 204 transmits the non-updated power reception status information 403 to the power supply apparatus 100 as the response data.

In step S507, the CPU 107 determines whether the power reception status information 403 is received from the electronic apparatus 200 by the communication unit 105 during a time period since the data for requesting the power reception status information 403 has been transmitted until the response time has elapsed. The response time in step S507 is the time indicated in the device information 401. If the power reception status information 403 is received from the electronic apparatus 200 by the communication unit 105 by the elapse of the response time (YES in step S507), the power supply process proceeds to step S508. If the power reception status information 403 is not received from the electronic apparatus 200 by the communication unit 105 even after the response time has elapsed (NO in step S507), the power supply process proceeds to step S513.

In step S508, the CPU 107 determines whether the power reception status information 403 is updated by the electronic apparatus 200.

For example, the CPU 107 analyzes the power reception status information 403 received from the electronic apparatus 200 by the communication unit 105, and acquires the update data included in the power reception status information 403. After that, the CPU 107 determines whether the power reception status information 403 is updated by the electronic apparatus 200 with use of the update data included in the power reception status information 403. At this time, the CPU 107 determines whether the update data stored in the RAM 109 before the reception of the power reception status information 403 in step S507 matches the update data included in the power reception status information 403 received in step S507. If the update data stored in the RAM 109 matches the update data included in the power reception status information 403 received from the electronic apparatus 200, the CPU 107 determines that the power reception status information 403 is not updated by the electronic apparatus 200 (NO in step S508). On the other hand, if the update data stored in the RAM 109 does not match the update data included in the power reception status information 403 received from the electronic apparatus 200, the CPU 107 determines that the power reception status information 403 is updated by the electronic apparatus 200 (YES in step S508). For example, if the update data stored in the RAM 109 is set to "N", the CPU 107 determines that the power reception status information 403 is not updated by the electronic apparatus 200 (NO in step S508) if the update data received from the electronic apparatus 200 is set to "N". On the other hand, if the update data stored in the RAM 109 is set to "N", the CPU 107 determines that the power reception status information 403 is updated by the electronic apparatus 200 (YES in step S508) if the update data received from the electronic apparatus 200 is set to "N+1".

If the power reception status information 403 is updated by the electronic apparatus 200 (YES in step S508), the CPU 107 determines that the power reception status information 403 acquired from the electronic apparatus 200 in step S507 is correct information, and then the power supply process proceeds to step S509. If the power reception status information 403 is not updated by the electronic apparatus 200 (NO in step S508), the CPU 107 determines that the power reception status information 403 acquired from the electronic apparatus 200 in step S507 is not correct information, and then the power supply process proceeds to step S513. In a case where the CPU 107 determines that the power reception status information 403 acquired from the electronic apparatus 200 is not correct information, the CPU 107 refrains from using the power reception status information 403 acquired from the electronic apparatus 200 to control power to be supplied wirelessly from the power supply apparatus 100 to the electronic apparatus 200.

If the power reception status information 403 is updated by the electronic apparatus 200 (YES in step S508), the CPU 107 deletes the update data stored in the RAM 109, and stores the update data included in the power reception status information 403 into the RAM 109. At this time, if the update data included in the power reception status information 403 is set to "N+1", the CPU 107 stores the value "N+1" of the update data into the RAM 109.

In step S509, the CPU 107 controls whether to supply power to the electronic apparatus 200 with use of the power reception status information 403 acquired from the electronic apparatus 200. For example, if the power reception status information 403 includes information indicating that the electronic apparatus 200 does not request the power supply apparatus 100 to supply power, the CPU 107 determines not to supply power to the electronic apparatus 200 (NO in step S509). If the power reception status information 403 includes information indicating that the battery 209 is fully charged, the CPU 107 determines not to supply power to the electronic apparatus 200 (NO in step S509). If the power reception status information 403 includes information indicating that an error occurs in the electronic apparatus 200, the CPU 107 determines not to supply power to the electronic apparatus 200 (NO in step S509). If the power reception status information 403 includes information indicating that the electronic apparatus 200 requests the power supply apparatus 100 to supply power, the CPU 107 determines to supply power to the electronic apparatus 200 (YES in step S509). If the power reception status information 403 includes information indicating that the battery 209 is not fully charged, the CPU 107 determines to supply the power to the electronic apparatus 200 (YES in step S509). If the power reception status information 403 includes information indicating that no error occurs in the electronic apparatus 200, the CPU 107 determines to supply power to the electronic apparatus 200 (YES in step S509).

If the CPU 107 determines to supply power to the electronic apparatus 200 (YES in step S509), the power supply process proceeds to step S510. If the CPU 107 determines not to supply power to the electronic apparatus 200 (NO in step S509), the power supply process proceeds to step S512.

In step S510, the CPU 107 controls at least one of the oscillator 102, the power generation unit 103, and the matching circuit 104 so as to supply the second power via the power supply antenna 106. In step S510, the CPU 107 sets a magnitude of the second power to be output via the power supply antenna 106 with use of at least one of the device information 401 and the power reception status information 403. After the power supply period has elapsed since the start of the output of the second power, the CPU 107 controls at least one of the oscillator 102, the power generation unit 103, and the matching circuit 104 so as to switch power to be output via the power supply antenna 106 from the second power to the first power. After that, the power supply process returns to step S505. The power supply period is the time period during which the power supply apparatus 100 outputs power that allows the electronic apparatus 200 to charge the battery 209 to the electronic apparatus 200. The power supply period may be a time period set by the CPU 107, or may be a predetermined time period. The CPU 107 may be configured to set the power supply time with use of the device information 401 acquired from the electronic apparatus 200. Upon the start of the output of the second power in step S510, the CPU 107 notifies the user that the power supply apparatus 100 is supplying power to the electronic apparatus 200 by lighting the LED 113. Furthermore or alternatively, upon the start of the output of the second power, the CPU 107 may notify the user that the power supply apparatus 100 is supplying power to the electronic apparatus 200 by controlling the display unit 110. After the start of the output of the second power, the power supply process returns to step S505.

In a case where the process of step S505 is performed again after the process of step S510 is performed, the CPU 107 generates the power supply status information 402 including the value of the update data that has been stored into the RAM 109 in step S508. After that, the CPU 107 controls the communication unit 105 so as to transmit the generated power supply status information 402 to the electronic apparatus 200.

In step S511, the CPU 107 controls at least one of the oscillator 102, the power generation unit 103, and the matching circuit 104 so as to stop the output of the power via the power supply antenna 106. Then, the power supply process ends.

In step S512, the CPU 107 generates the power supply status information 402, and controls the communication unit 105 so as to transmit the generated power supply status information 402 to the electronic apparatus 200. The power supply status information 402 generated by the CPU 107 in step S512 includes information indicating that the power supply apparatus 100 will stop supplying power from the power supply apparatus 100 to the electronic apparatus 200. If an error occurs in the power supply apparatus 100, the power supply status information 402 generated by the CPU 107 in step S512 further includes information indicating that an error occurs in the power supply apparatus 100.

Upon the transmission of the power supply status information 402 by the communication unit 105, the power supply process proceeds to step S511. In a case where the power supply status information 402 is transmitted by the communication unit 105, the CPU 107 notifies the user that the power supply from the power supply apparatus 100 to the electronic apparatus 200 is completed by lighting the LED 113. Alternatively, in a case where the output of the first power is started, the CPU 107 may notify the user that the power supply from the power supply apparatus 100 to the electronic apparatus 200 is completed by controlling the display unit 110.

If the sufficient power is not supplied from any one of the battery 209 and the rectification and smoothing circuit 203 to the CPU 206, the CPU 206 may be unable to generate the power reception status information 403. In this case, since the power reception status information 403 is not stored in the memory 204*a*, the electronic apparatus 200 may be unable to transmit the power reception status information 403 to the power supply apparatus 100, even when the power reception status information 403 is requested from the power supply apparatus 100. To solve such a situation, if the power reception status information 403 is not received from the electronic apparatus 200 (NO in step S507), the power supply apparatus 100 supplies power for charging the battery 209 to the electronic apparatus 200 so that the remaining capacity of the battery 209 reaches or exceeds a predetermined value. The predetermined value corresponds to the remaining capacity when the battery 209 can supply, to the CPU 206, power required to allow the CPU 206 to generate the power reception status information 403 and store the generated power reception status information 403 into the memory 204*a*. If the remaining capacity of the battery 209 is the predetermined value or larger, the CPU 206 can generate the power reception status information 403 and store the generated power reception status information 403 into the memory 204*a* with use of power supplied from the battery 209. Therefore, the CPU 107 performs a process of step S513.

If the sufficient power is not supplied from any one of the battery 209 and the rectification and smoothing circuit 203 to the CPU 206, the CPU 206 may be unable to update the power reception status information 403 stored in the memory 204*a*. In this case, the electronic apparatus 200 may transmit the non-updated power reception status information 403 to the power supply apparatus 100 according to the issue of the request for the power reception status information 403 from the power supply apparatus 100. To solve such a situation, if the power reception status information 403 is not updated (NO in step S508), the power supply apparatus 100 supplies power for charging the battery 209 to the electronic apparatus 200 so that the remaining capacity of the battery 209 reaches or exceeds a predetermined value. If the remaining capacity of the battery 209 is the predetermined value or larger, the CPU 206 can update the power reception status information 403 with use of power supplied from the battery 209. Therefore, the CPU 107 performs the process of step S513.

In step S513, the CPU 107 controls at least one of the oscillator 102, the power generation unit 103, and the matching circuit 104 so as to output the first power via the power supply antenna 106 to allow the electronic apparatus 200 to charge the battery 209.

In a case where the process of step S513 is performed, the CPU 107 cannot check the state of the electronic apparatus 200 and the state of the battery 209. Therefore, if the power supply apparatus 100 supplies high power to the electronic apparatus 200 as the power that allows the electronic apparatus 200 to charge the battery 209, this may result in supply of excessive power to the electronic apparatus 200. To prevent such a situation, in step S513, the CPU 107 controls at least one of the oscillator 102, the power generation unit 103, and the matching circuit 104 to output the first power, which is expected not to be excessive power for the electronic apparatus 200, to the electronic apparatus 200.

After a predetermined time has elapsed since the start of the output of the first power, the power supply process proceeds to step S514. Upon the start of the output of the first power in step S513, the CPU 107 notifies the user that the power supply apparatus 100 is supplying the power to the electronic apparatus 200 by lighting the LED 113.

Alternatively, upon the start of the output of the first power, the CPU 107 may notify the user that the power supply apparatus 100 is supplying the power to the electronic apparatus 200 by controlling the display unit 110.

In step S514, the CPU 107 controls the communication unit 105 so as to temporarily disconnect the wireless communication with the electronic apparatus 200. After that, the CPU 107 causes the communication unit 105 to carry out the authentication for wirelessly communicating with the communication unit 204 again. Then, the power supply process proceeds to step S515.

In step S515, the CPU 107 determines whether the authentication for wirelessly communicating with the communication unit 204 is completed, similarly to step S503. If the authentication for wirelessly communicating with the communication unit 204 is completed (YES in step S515), the power supply process proceeds to step S516. If the authentication for wirelessly communicating with the communication unit 204 is not completed (NO in step S515), the power supply process proceeds to step S511.

In step S516, the CPU 107 determines whether the electronic apparatus 200 supports the wireless power supply, similarly to step S504. If the electronic apparatus 200 supports the wireless power supply (YES in step S516), the power supply process returns to step S506. If the electronic apparatus 200 does not support the wireless power supply (NO in step S516), the power supply process proceeds to step S511.

If the electronic apparatus 200 supports the wireless power supply (YES in step S516), the power supply process returns to step S506. If the power reception status information 403 is not received from the electronic apparatus 200 (NO in step S507), the CPU 206 has been unable to add the specific value to the value of the update data included in the power supply status information 402. In this case, even if the CPU 107 performs the process of step S505 again, this process just results in transmission of the same data as the power supply status information 402 previously transmitted to the electronic apparatus 200 to the electronic apparatus 200. Therefore, the CPU 107 prevents itself from repeating the transmission of the same data to facilitate a quick increase in the remaining capacity of the battery 209 to the predetermined value or larger. For this reason, if the power reception status information 403 is not received from the electronic apparatus 200 (NO in step S507), the CPU 107 performs the process of step S506 without performing the process of step S505.

If the power reception status information 403 is not updated by the electronic apparatus 200 (NO in step S508), the CPU 107 also performs the process of step S506 without performing the process of step S505 in a similar manner, thereby preventing itself from repeating the transmission of the same data.

The CPU 107 is configured to determine, in step S508, whether the power reception status information 403 is updated by the electronic apparatus 200 according to whether the specific value is added by the electronic apparatus 200 to the value of the update data transmitted from the power supply apparatus 100. However, the method for determining the update is not limited thereto. For example, the CPU 206 may cause the communication unit 204 to transmit, to the power supply apparatus 100, data generated by subtracting a specific value from the value of the update data received from the power supply apparatus 100, after completing the update of the power reception status information 403. In this case, the CPU 107 is configured to determine, in step S508, whether the power reception status information 403 is updated by the electronic apparatus 200 according to whether the specific value is subtracted by the electronic apparatus 200 from the value of the update data transmitted from the power supply apparatus 100.

Alternatively, for example, the CPU 206 may cause the communication unit 204 to transmit, to the power supply apparatus 100, data generated by changing the value of the update data received from the power supply apparatus 100, after completing the update of the power reception status information 403. In this case, the CPU 107 is configured to determine, in step S508, whether the power reception status information 403 is updated by the electronic apparatus 200 according to whether any change is made by the electronic apparatus 200 to the value of the update data transmitted from the power supply apparatus 100.

If the power reception status information 403 is updated by the electronic apparatus 200 (YES in step S508), the CPU 107 may further determine that the remaining capacity of the battery 209 is the predetermined value or larger. If the power reception status information 403 is not updated by the electronic apparatus 200 (NO in step S508), the CPU 107 may further determine that the remaining capacity of the battery 209 is not the predetermined value or larger.

The CPU 107 is configured to control, in step S513, at least one of the oscillator 102, the power generation unit 103, and the matching circuit 104 so as to output the first power to the electronic apparatus 200. However, the power expected not to be excessive power for the electronic apparatus 200 is not limited to the first power. Therefore, the CPU 107 may be configured to cause, in step S513, power other than the first power to be output to the electronic apparatus 200 as long as the CPU 107 causes the power expected not to be excessive power for the electronic apparatus 200 to be output to the electronic apparatus 200.

If the wireless communication between the electronic apparatus 200 and the communication unit 105 is disconnected, the CPU 107 resets the update data stored in the RAM 109. After that, in a case where acquiring the power reception status information 403 after the wireless communication between the electronic apparatus 200 and the communication unit 105 is established, the CPU 107 sets the update data again, and performs control so as to transmit the power supply status information 402 including this update data to the electronic apparatus 200.

Alternatively, the CPU 107 may reset the update data stored in the RAM 109 after the wireless communication between the electronic apparatus 200 and the communication unit 105 is disconnected and then the wireless communication between the electronic apparatus 200 and the communication unit 105 is established. In this case, when acquiring the power reception status information 403, the CPU 107 sets the update data again, and performs control so as to transmit the power supply status information 402 including this update data to the electronic apparatus 200.

(Power Reception Process)

A power reception process performed by the electronic apparatus 200 will be described with reference to a flowchart illustrated in FIG. 6 (consisting of FIGS. 6A and 6B).

In a case where the power reception antenna 201 receives power from the power supply apparatus 100, and power received by the power reception antenna 201 is supplied to the communication unit 204, in step S601, the communication unit 204 carries out the authentication for wirelessly communicating with the communication unit 105. After that, the power reception process proceeds to step S602.

In step S602, the communication unit 204 determines whether the authentication for wirelessly communicating with the communication unit 105 is completed. If the authentication for wirelessly communicating with the communication unit 105 is completed (YES in step S602), the power reception process proceeds to step S603. If the authentication for wirelessly communicating with the communication unit 105 is not completed (NO in step S602), the power reception process ends.

In step S603, the communication unit 204 determines whether data is received from the power supply apparatus 100. If data is received from the power supply apparatus 100 by the communication unit 204 (YES in step S603), the power reception process proceeds to step S604. If data is not received from the power supply apparatus 100 by the communication unit 204 (NO in step S603), the power reception process returns to step S603.

In step S604, the communication unit 204 determines whether the power supply status information 402 including the information indicating that the power supply apparatus 100 will stop supplying power from the power supply apparatus 100 to the electronic apparatus 200 is received. If the power supply status information 402 including the information indicating that the power supply apparatus 100 will stop supplying power from the power supply apparatus 100 to the electronic apparatus 200 is stored into the wireless power supply data group 400 in the memory 204a (YES in step S604), the communication unit 204 transmits the response data to the power supply apparatus 100. Then, the power reception process ends. If the power supply status information 402 including the information indicating that the power supply apparatus 100 will stop supplying power from the power supply apparatus 100 to the electronic apparatus 200 is not received (NO in step S604), the power reception process proceeds to step S605.

In step S605, the communication unit 204 determines whether the data for requesting the device information 401 is received. If the data for requesting the device information 401 is received (YES in step S605), the power reception process proceeds to step S606. If the data for requesting the device information 401 is not received (NO in step S605), the power reception process proceeds to step S607.

In step S606, the communication unit 204 transmits the device information 401 read out from the wireless power supply data group 400 in the memory 204a to the power supply apparatus 100. Then, the power reception process proceeds to step S614.

In step S607, the communication unit 204 determines whether the power supply status information 402 including the information indicating that the power supply apparatus 100 will start supplying power from the power supply apparatus 100 to the electronic apparatus 200 is received. If the power supply status information 402 including the information indicating that the power supply apparatus 100 will start supplying power from the power supply apparatus 100 to the electronic apparatus 200 is stored into the wireless power supply data group 400 in the memory 204a (YES in step S607), the communication unit 204 transmits the response data to the power supply apparatus 100. Then, the power reception process proceeds to step S612. If the power supply status information 402 including the information indicating that the power supply apparatus 100 will start supplying power from the power supply apparatus 100 to the electronic apparatus 200 is not received (NO in step S607), the power reception process proceeds to step S608.

In step S608, the communication unit 204 determines whether the data for requesting the power reception status information 403 is received. If the data for requesting the power reception status information 403 is received (YES in step S608), the power reception process proceeds to step S609. If the data for requesting the power reception status information 403 is received (YES in step S608), the communication unit 204 outputs a notification to the CPU 206 to instruct the CPU 206 to update the power reception status information 403. If the data for requesting the power reception status information 403 is not received (NO in step S608), the power reception process proceeds to step S615.

In step S609, the CPU 206 determines whether the CPU 206 can update the power reception status information 403. If the CPU 206 can update the power reception status information 403 (YES in step S609), the power reception process proceeds to step S610. If the CPU 206 cannot update the power reception status information 403 (NO in step S609), the power reception process proceeds to step S611.

If the remaining capacity of the battery 209 is the predetermined value or larger, the CPU 206 can update the power reception status information 403 with use of power supplied from the battery 209 to the CPU 206 (YES in step S609). If the remaining capacity of the battery 209 is not the predetermined value or larger, since power supplied from the battery 209 is insufficient as power to be used to update the power reception status information 403, the CPU 206 cannot update the power reception status information 403 (NO in step S609).

Furthermore, if power received from the power supply apparatus 100 by the power reception antenna 201 is the predetermined power or higher, the CPU 206 can update the power reception status information 403 with use of power received by the power reception antenna 201 (YES in step S609). If power received by the power reception antenna 201 is not the predetermined power or higher, since power received by the power reception antenna 201 is insufficient as power to be used to update the power reception status information 403, the CPU 206 cannot update the power reception status information 403 (NO in step S609).

Furthermore, even when power to be used to update the power reception status information 403 is supplied to the CPU 206, the CPU 206 cannot update the power reception status information 403 (NO in step S609) if an error occurs in the CPU 206. In a case where power to be used to update the power reception status information 403 is supplied to the CPU 206, the CPU 206 can update the power reception status information 403 (YES in step S609) if no error occurs in the CPU 206.

In step S610, the CPU 206 updates the power reception status information 403 according to the notification received from the communication unit 204. Furthermore, upon completing the update of the power reception status information 403, the CPU 206 adds the specific value to the value of the update data included in the power supply status information 402 stored in step S608, and stores this value of the update data into the power reception status information 403. Then, the power reception process proceeds to step S611.

In step S611, the communication unit 204 transmits the power reception status information 403 stored in the wireless power supply data group 400 in the memory 204a during the time period since the data for requesting the power reception status information 403 has been received until the response time has elapsed. Then, the power reception process proceeds to step S612. If the CPU 206 can update the power reception status information 403 (YES in step S609), the communication unit 204 transmits the power reception status information 403 updated by the CPU 206 in step S610 to the power supply apparatus 100. If the CPU 206 cannot update the power reception status information 403 (NO in step S609), the communication unit 204 transmits the power reception status information 403 not updated by the CPU 206 to the power supply apparatus 100.

In step S612, the electronic apparatus 200 determines whether the power for charging the battery 209 is being supplied from the power supply apparatus 100 to the electronic apparatus 200. For example, the electronic apparatus 200 determines whether the power for charging the battery 209 is being supplied from the power supply apparatus 100 to the electronic apparatus 200, according to whether the direct-current power is being supplied from the rectification and smoothing circuit 203 to the regulator 205. If any one of the first power and the second power is being output from the power supply apparatus 100 via the power supply antenna 106, the direct-current power is be being supplied from the rectification and smoothing circuit 203 to the regulator 205. In this case, the electronic apparatus 200 determines that the power for charging the battery 209 is being supplied from the power supply apparatus 100 to the electronic apparatus 200 (YES in step S612). If the direct-current power is being supplied from the rectification and smoothing circuit 203 to the regulator 205 (YES in step S612), the power reception process proceeds to step S613. If neither of the first power and the second power is being output from the power supply apparatus 100 via the power supply antenna 106, the direct-current power is not be being supplied from the rectification and smoothing circuit 203 to the regulator 205. In this case, the electronic apparatus 200 determines that the power for charging the battery 209 is not being supplied from the power supply apparatus 100 to the electronic apparatus 200 (NO in step S612). If the direct-current power is not being supplied from the rectification and smoothing circuit 203 to the regulator 205 (NO in step S612), the power reception process proceeds to step S614.

In step S613, the charging unit 208 charges the battery 209 with use of power supplied from the regulator 205. Then, the power reception process proceeds to step S614.

In step S614, the communication unit 204 determines whether the communication unit 204 can wirelessly communicate with the power supply apparatus 100. If the communication unit 204 determines that the communication unit 204 can wirelessly communicate with the power supply apparatus 100 (YES in step S614), the power reception process returns to step S603. If the communication unit 204 determines that the communication unit 204 cannot wirelessly communicate with the power supply apparatus 100 (NO in step S614), the power reception process returns to step S601.

In step S615, the communication unit 204 outputs, to the CPU 206, a notification for causing the CPU 206 to perform a process corresponding to the data received from the power supply apparatus 100. After that, the CPU 206 controls the electronic apparatus 200 according to the notification from the communication unit 204. Then, the power reception process proceeds to step S614.

Next, an operation of the power supply apparatus 100 when the power supply process illustrated in FIG. 4 is performed by the power supply apparatus 100 will be described with reference to FIG. 7. A horizontal axis and a vertical axis illustrated in FIG. 7 represent time and power output from the power supply apparatus 100, respectively.

If the power reception status information 403 is not received by the communication unit 105 (NO in step S507), the power supply apparatus 100 performs operations of authentication 701, communication 702, and a first power output 703. If the power reception status information 403 is not updated (NO in step S508), the power supply apparatus 100 also performs the operations of the authentication 701, the communication 702, and the first power output 703.

The authentication 701 is the authentication operation for wirelessly communicating with the communication unit 204. The communication 702 is the operation for acquiring the power reception status information 403 from the electronic apparatus 200. The first power output 703 is the operation of outputting the first power.

After outputting the first power by the operation of the first power output 703, the power supply apparatus 100 performs operations of authentication 704 and communication 705. The authentication 704 is a similar operation to the authentication 701, and the communication 705 is a similar operation to the communication 702. If it is determined that the power reception status information 403 is updated (YES in step S508) after the power reception status information 403 is acquired from the electronic apparatus 200 by the operation of the communication 705 (YES in step S507), the power supply apparatus 100 performs an operation of a second power output 706. The second power output 706 is the operation of outputting the second power with use of the power reception status information 403 acquired from the electronic apparatus 200 by the operation of the communication 705. After performing the operation of the second power output 706, the power supply apparatus 100 performs an operation of communication 707 again. The communication 707 is a similar operation to the communication 702. After performing the operation of the communication 707, the power supply apparatus 100 performs an operation of a second power output 708. The second power output 708 is a similar operation to the second power output 706. After that, the power supply apparatus 100 repeatedly performs the operations of the communication 707 and the second power output 708 until determining not to supply the power to the electronic apparatus 200 (NO in step S509).

In this manner, the power supply apparatus 100 according to the first exemplary embodiment is configured to be able to determine whether the power reception status information 403 received from the electronic apparatus 200 is updated by the electronic apparatus 200. Furthermore, the power supply apparatus 100 is configured to determine whether the power reception status information 403 received from the electronic apparatus 200 is correct according to the result of the determination about whether the power reception status information 403 received from the electronic apparatus 200 is updated by the electronic apparatus 200.

As a result, if the power reception status information 403 received from the electronic apparatus 200 is updated by the electronic apparatus 200 (YES in step S508), the power supply apparatus 100 can appropriately control, with use of the power reception status information 403 determined to be correct, power to be supplied wirelessly from the power supply apparatus 100 to the electronic apparatus 200. Furthermore, if the power reception status information 403 received from the electronic apparatus 200 is not updated by the electronic apparatus 200 (NO in step S508), the power supply apparatus 100 is configured to refrain from using the power reception status information 403 determined to be incorrect. As a result, the power supply apparatus 100 can be prevented from performing incorrect control on the electronic apparatus 200.

Furthermore, if the power reception status information 403 received from the electronic apparatus 200 is not updated by the electronic apparatus 200 (NO in step S508), the power supply apparatus 100 is configured to supply the power slight but enough to update the power reception status information 403 to the electronic apparatus 200. In this case, the power supply apparatus 100 can allow the electronic apparatus 200 to charge the battery 209 while preventing power from being excessively supplied to the electronic apparatus 200. As a result, the power supply apparatus 100 can bring the electronic apparatus 200 into the state capable of updating the power reception status information 403, and thus the power supply apparatus 100 can appropriately control, with use of the power reception status information 403 updated by the electronic apparatus 200, power to be supplied wirelessly from the power supply apparatus 100 to the electronic apparatus 200.

In the first exemplary embodiment, the power supply apparatus 100 and the electronic apparatus 200 are assumed to wirelessly communicate with each other based on the NFC standard. However, the power supply apparatus 100 and the electronic apparatus 200 may wirelessly communicate with each other based on a standard other than the NFC standard. For example, the power supply apparatus 100 and the electronic apparatus 200 may perform wireless communication in compliance with ISO/IEC (International Organization for Standardization/International Electrotechnical Commission) 18092 standard, instead of the NFC standard. Alternatively, the power supply apparatus 100 and the electronic apparatus 200 may perform wireless communication in compliance with Radio Frequency Identification (RFID), instead of the NFC standard. Alternatively, the power supply apparatus 100 and the electronic apparatus 200 may perform wireless communication in compliance with ISO/IEC 14443 standard, instead of the NFC standard. Alternatively, the power supply apparatus 100 and the electronic apparatus 200 may perform wireless communication in compliance with TransferJet (registered trademark) standard, instead of the NFC standard. Alternatively, the power supply apparatus 100 and the electronic apparatus 200 may perform wireless communication in compliance with ISO/IEC 21481 standard, instead of the NFC standard. Alternatively, the power supply apparatus 100 and the electronic apparatus 200 may perform wireless communication in compliance with Bluetooth (registered trademark) standard or wireless LAN (local area network) standard, instead of the NFC standard.

In the first exemplary embodiment, the power supply apparatus 100 is configured to supply the second power to the electronic apparatus 200 with use of the power supply antenna 106, and perform the communication between the communication unit 105 and the electronic apparatus 200 with use of the power supply antenna 106. However, the use of the antenna is not limited thereto. For example, the power supply apparatus 100 may be configured to separately include an antenna for supplying the second power to the electronic apparatus 200, and an antenna for performing the communication between the communication unit 105 and the electronic apparatus 200. Therefore, a resonance frequency corresponding to the antenna for supplying the second power to the electronic apparatus 200, and a resonance frequency corresponding to the antenna for performing the communication between the communication unit 105 and the electronic apparatus 200 may be equal frequencies, or may be different frequencies. In this case, the resonance frequency corresponding to the antenna for supplying the second power to the electronic apparatus 200 may be 6.78 MHz, or may be a frequency of 100 KHz to 250 KHz. The resonance frequency corresponding to the antenna for performing the communication between the communication unit 105 and the electronic apparatus 200 may be a frequency other than 13.56 MHz as long as this frequency is a frequency in compliance with the communication standard of the communication unit 105.

Furthermore, the electronic apparatus 200 is configured to receive power from the power supply apparatus 100 with use of the power reception antenna 201, and perform the communication between the power supply apparatus 100 and the communication unit 204 with use of the power reception antenna 201. However, the use of the antenna is not limited thereto. For example, the electronic apparatus 200 may be configured to separately include an antenna for receiving power from the power supply apparatus 100, and an antenna for performing the communication between the power supply apparatus 100 and the communication unit 204. Therefore, a resonance frequency corresponding to the antenna for receiving power from the power supply apparatus 100, and a resonance frequency corresponding to the antenna for performing the communication between the power supply apparatus 100 and the communication unit 204 may be equal frequencies, or may be different frequencies. In this case, the resonance frequency corresponding to the antenna for receiving power from the power supply apparatus 100 may be 6.78 MHz, or may be a frequency of 100 KHz to 250 KHz. The resonance frequency corresponding to the antenna for performing the communication between the power supply apparatus 100 and the communication unit 204 may be a frequency other than 13.56 MHz as long as this frequency is a frequency corresponding to the communication standard of the communication unit 204.

Other Exemplary Embodiments

The power supply apparatus according to the present invention is not limited to the power supply apparatus 100 described in the first exemplary embodiment. Furthermore, the electronic apparatus according to the present invention is not also limited to the electronic apparatus 200 described in the first exemplary embodiment. For example, each of the power supply apparatus and the electronic apparatus according to the present invention can be also realized by a system including apparatuses.

Furthermore, various kinds of processes and functions described in the first exemplary embodiment can be also realized by a computer program. In this case, the computer program according to the present invention can be executed by a computer (including a CPU and the like), and is configured to realize various kinds of functions described in the first exemplary embodiment.

Needless to say, the computer program according to the present invention may realize various kinds of processes and functions described in the first exemplary embodiment with use of an operating system (OS) and/or the like running on the computer.

The computer program according to the present invention is read out from a computer-readable recording medium to be executed by the computer. A hard disk device, an optical disk, a compact disk read only memory (CD-ROM), a compact disk recordable (CD-R), a memory card, a ROM, or the like can be used as the computer-readable recording medium. These recording media are non-transitory recording media. Alternatively, the computer program according to the present invention may be configured to be provided from an external apparatus to the computer via a communication interface to be executed by this computer.

While the present invention is described with reference to exemplary embodiments, it is to be understood that the present invention is not limited to the exemplary embodiments. The scope of the following claims is to be accorded the broadest interpretation so as to encompass all modifications and equivalent structures.

This application claims priority from Japanese Patent Application No. 2014-192878, filed Sep. 22, 2014, which is hereby incorporated by reference herein in its entirety.

What is claimed is:

1. A power supply apparatus comprising:
   a power supply unit that wirelessly supplies power to an electronic apparatus;
   a communication unit that communicates with the electronic apparatus; and
   a control unit that controls, based on whether information regarding the electronic apparatus that is received from the electronic apparatus is updated by the electronic apparatus, power to be supplied from the power supply apparatus to the electronic apparatus,
   wherein the control unit controls the power supply unit so as to supply power to the electronic apparatus without using the information regarding the electronic apparatus that is received from the electronic apparatus, in a case where the information regarding the electronic apparatus that is received from the electronic apparatus is not updated by the electronic apparatus.

2. The power supply apparatus according to claim 1, wherein the control unit controls, based on the information regarding the electronic apparatus that is received from the electronic apparatus, power to be supplied from the power supply apparatus to the electronic apparatus, in a case where the information regarding the electronic apparatus that is received from the electronic apparatus is updated by the electronic apparatus.

3. The power supply apparatus according to claim 1,
   wherein the control unit controls the power supply unit so as to supply first power to the electronic apparatus, in a case where the information regarding the electronic apparatus that is received from the electronic apparatus is not updated by the electronic apparatus, and
   wherein the control unit controls the power supply unit so as to supply second power, which is determined by the information regarding the electronic apparatus that is received from the electronic apparatus, to the electronic apparatus, in a case where the information regarding the electronic apparatus that is received from the electronic apparatus is updated by the electronic apparatus.

4. The power supply apparatus according to claim 3, wherein the first power is lower than the second power.

5. The power supply apparatus according to claim 3, wherein the control unit controls the power supply unit so as to refrain from supplying power higher than the first power to the electronic apparatus until the information regarding the electronic apparatus that is received from the electronic apparatus is updated by the electronic apparatus, in a case where the information regarding the electronic apparatus that is received from the electronic apparatus is not updated by the electronic apparatus.

6. The power supply apparatus according to claim 4, further comprising
   a notification unit that notifies the electronic apparatus that the power supply apparatus supplies power to the electronic apparatus, in a case where the first power or the second power is supplied from the power supply unit to the electronic apparatus.

7. The power supply apparatus according to claim 1, wherein the control unit prevents the communication unit from transmitting data to be stored into a storage unit of the electronic apparatus until the information regarding the electronic apparatus that is received from the electronic apparatus is updated by the electronic apparatus, in a case where the information regarding the electronic apparatus that is received from the electronic apparatus is not updated by the electronic apparatus.

8. The power supply apparatus according to claim 1, wherein the control unit determines whether the information regarding the electronic apparatus that is received from the electronic apparatus is updated by the electronic apparatus, with use of information received from the electronic apparatus by the communication unit.

9. The power supply apparatus according to claim 1, wherein the information regarding the electronic apparatus includes information indicating whether an error occurs in the electronic apparatus, information regarding a battery of the electronic apparatus, information regarding charging of the battery of the electronic apparatus, information indicating whether the electronic apparatus requests the power supply apparatus to supply power, or information used for the electronic apparatus to request the power supply apparatus to increase or reduce power.

10. A control method for a power supply apparatus having a power supply unit and a communication unit, the method comprising:
    wirelessly supplying power to an electronic apparatus;
    communicating with the electronic apparatus;
    controlling, based on whether information regarding the electronic apparatus that is received from the electronic apparatus is updated by the electronic apparatus, power to be supplied from the power supply apparatus to the electronic apparatus; and
    controlling the power supply unit so as to supply power to the electronic apparatus without using the information regarding the electronic apparatus that is received from the electronic apparatus, in a case where the information regarding the electronic apparatus that is received from the electronic apparatus is not updated by the electronic apparatus.

11. The method according to claim 10, further comprising:
    controlling, based on the information regarding the electronic apparatus that is received from the electronic apparatus, power to be supplied from the power supply apparatus to the electronic apparatus, in a case where the information regarding the electronic apparatus that is received from the electronic apparatus is updated by the electronic apparatus.

12. The method according to claim 10, further comprising:
    controlling the power supply unit so as to supply first power to the electronic apparatus, in a case where the information regarding the electronic apparatus that is received from the electronic apparatus is not updated by the electronic apparatus; and
    controlling the power supply unit so as to supply second power, which is determined by the information regarding the electronic apparatus that is received from the electronic apparatus, to the electronic apparatus, in a case where the information regarding the electronic apparatus that is received from the electronic apparatus is updated by the electronic apparatus.

13. The method according to claim 12, wherein the first power is lower than the second power.

14. The method according to claim 12, further comprising:
    controlling the power supply unit so as to refrain from supplying power higher than the first power to the electronic apparatus until the information regarding the electronic apparatus that is received from the electronic apparatus is updated by the electronic apparatus, in a case where the information regarding the electronic apparatus that is received from the electronic apparatus is not updated by the electronic apparatus.

15. The method according to claim 13, further comprising:
notifying the electronic apparatus that the power supply apparatus supplies power to the electronic apparatus, in a case where the first power or the second power is supplied from the power supply unit to the electronic apparatus.

16. The method according to claim 10, further comprising:
preventing the communication unit from transmitting data to be stored into a storage unit of the electronic apparatus until the information regarding the electronic apparatus that is received from the electronic apparatus is updated by the electronic apparatus, in a case where the information regarding the electronic apparatus that is received from the electronic apparatus is not updated by the electronic apparatus.

17. The method according to claim 10, further comprising:
determining whether the information regarding the electronic apparatus that is received from the electronic apparatus is updated by the electronic apparatus, with use of information received from the electronic apparatus by the communication unit.

18. The method according to claim 10, wherein the information regarding the electronic apparatus includes information indicating whether an error occurs in the electronic apparatus, information regarding a battery of the electronic apparatus, information regarding charging of the battery of the electronic apparatus, information indicating whether the electronic apparatus requests the power supply apparatus to supply power, or information used for the electronic apparatus to request the power supply apparatus to increase or reduce power.

19. A non-transitory computer-readable storage medium which stores a program for causing a power supply apparatus having a power supply unit and a communication unit to execute a process, the process comprising:
wirelessly supplying power to an electronic apparatus;
communicating with the electronic apparatus;
controlling, based on whether information regarding the electronic apparatus that is received from the electronic apparatus is updated by the electronic apparatus, power to be supplied from the power supply apparatus to the electronic apparatus; and
controlling the power supply unit so as to supply power to the electronic apparatus without using the information regarding the electronic apparatus that is received from the electronic apparatus, in a case where the information regarding the electronic apparatus that is received from the electronic apparatus is not updated by the electronic apparatus.

* * * * *